United States Patent
Noda et al.

Patent Number: 6,111,704
Date of Patent: *Aug. 29, 2000

[54] READOUT LENS

[75] Inventors: Takayuki Noda; Ryoko Otomo, both of Omiya, Japan

[73] Assignee: Fuji Photo Optical Co., Ltd., Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/339,952

[22] Filed: Jun. 25, 1999

Related U.S. Application Data

[63] Continuation-in-part of application No. 09/022,470, Feb. 12, 1998, abandoned.

[30] Foreign Application Priority Data

Mar. 12, 1997 [JP] Japan .................................. 9-79084

[51] Int. Cl.⁷ .................................................. G02B 9/14
[52] U.S. Cl. ........................ 359/790; 359/784; 359/785
[58] Field of Search .......................... 359/642, 784–785, 359/790

[56] References Cited

U.S. PATENT DOCUMENTS

| | | | |
|---|---|---|---|
| 3,967,884 | 7/1976 | De Jager | 359/790 |
| 5,568,322 | 10/1996 | Azami et al. | 359/785 |
| 5,754,347 | 5/1998 | Kobayashi | 359/790 |

FOREIGN PATENT DOCUMENTS

| | | | |
|---|---|---|---|
| 63-307414 | 12/1988 | Japan | 359/785 |
| 2-42411 | 2/1990 | Japan . | |
| 2-39765 | 9/1990 | Japan . | |
| 6-51195 | 2/1994 | Japan | 359/785 |

OTHER PUBLICATIONS

English Abstract of Japanese Reference No. 2–42411.
English Abstract of Japanese Reference No. 2–39765.

*Primary Examiner*—Thong Nguyen
*Attorney, Agent, or Firm*—Ronald R. Snider; Snider & Associates

[57] ABSTRACT

In a three-sheet image readout lens, predetermined expressions are satisfied, so as to yield a bright lens system which can favorably correct each kind of aberration, while attaining a smaller size and a lighter weight. The lens system is constituted by, successively from the object side, three positive, negative, and positive lenses $L_1$ to $L_3$, while a stop i is disposed downstream the third lens $L_3$, satisfying the following conditional expressions (1) to (6):

(1) $0.85 < f_1/f < 0.93$
(2) $-0.90 < f_2/f_3 < -0.84$
(3) $0.025 < d_2/f < 0.043$
(4) $0.09 < d_5/f < 0.16$
(5) $-2.5 < r_3/r_4 < -2.1$
(6) $|d_6|/f \leq 0.03$.

1 Claim, 4 Drawing Sheets

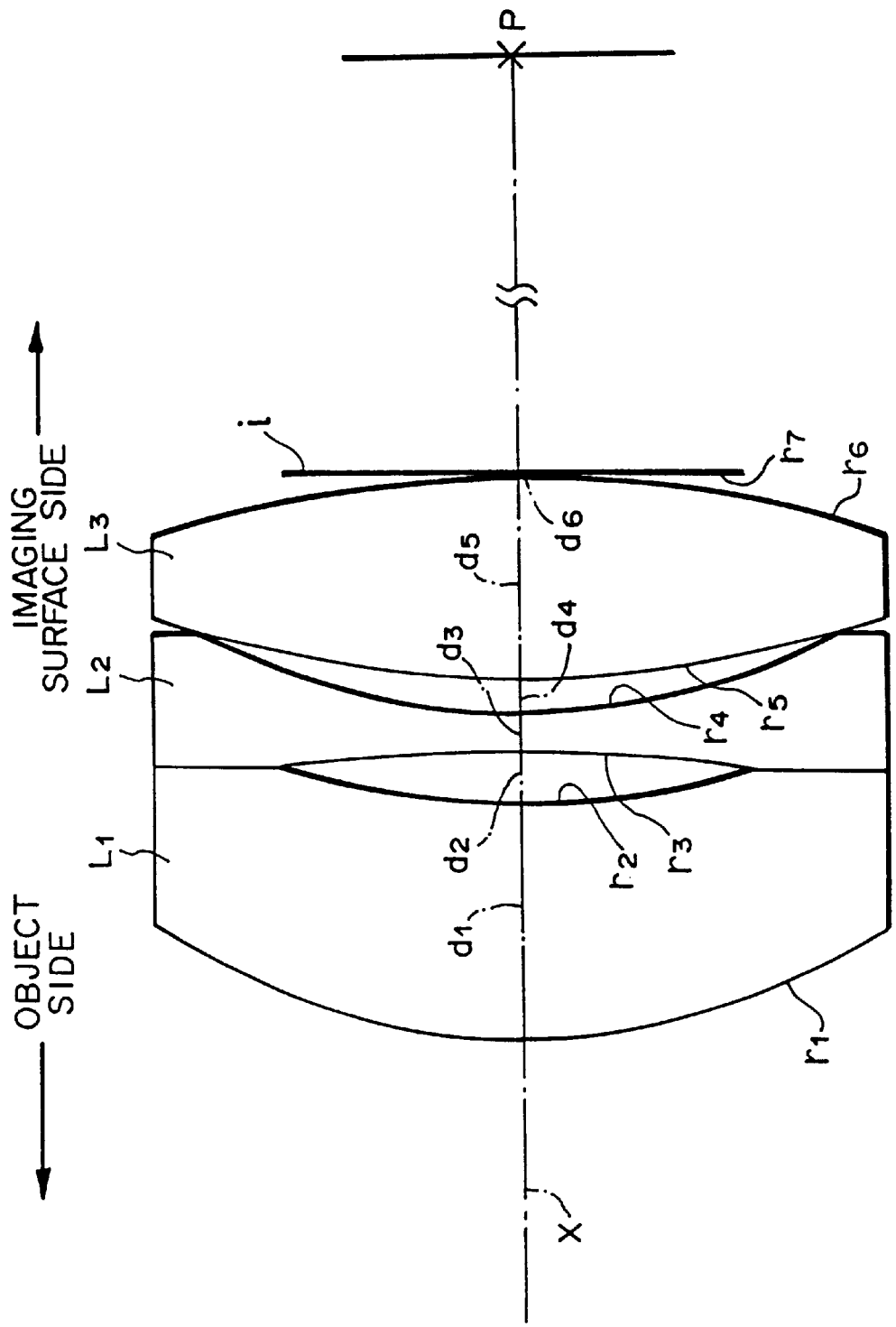

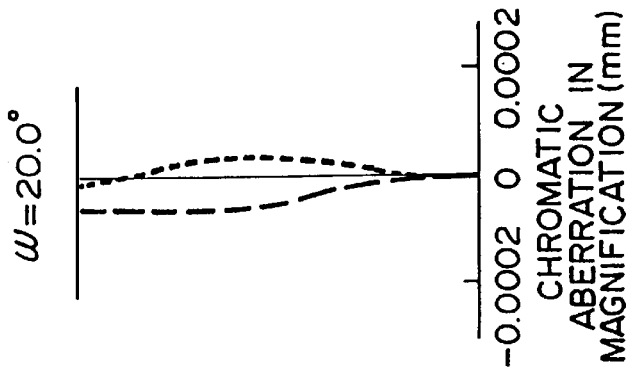
FIG.3A EXAMPLE 2 F/5.0
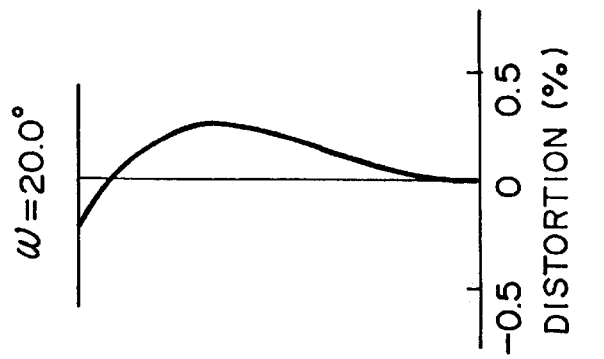
FIG.3B EXAMPLE 2 ω=20.0°
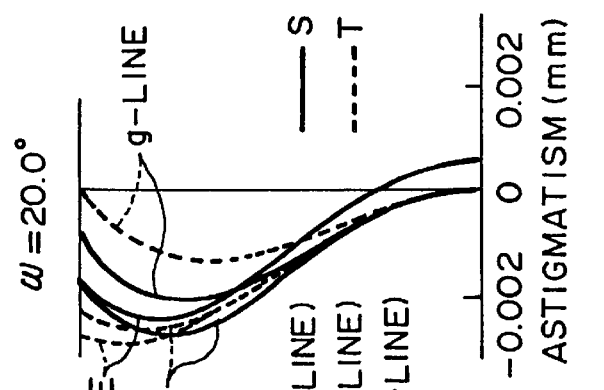
FIG.3C EXAMPLE 2 ω=20.0°
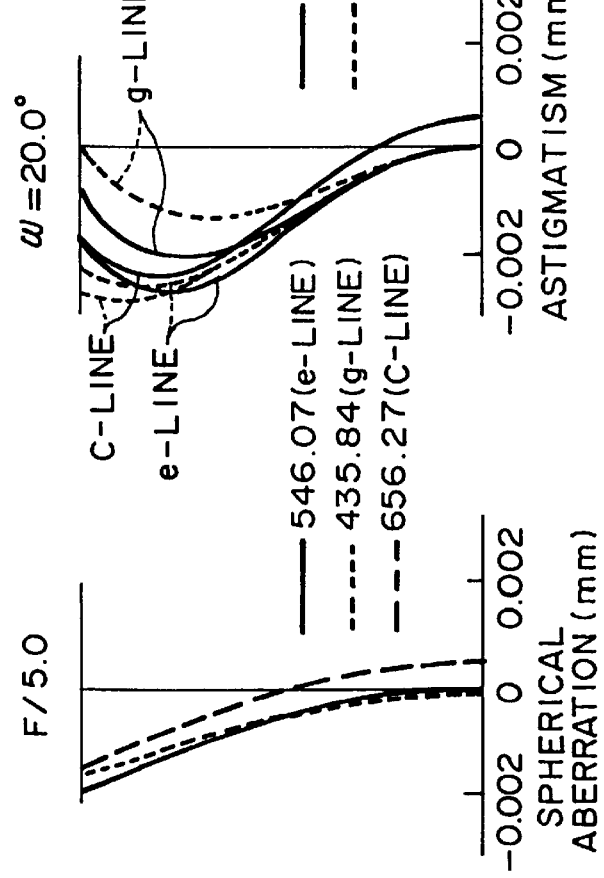
FIG.3D EXAMPLE 2 ω=20.0°

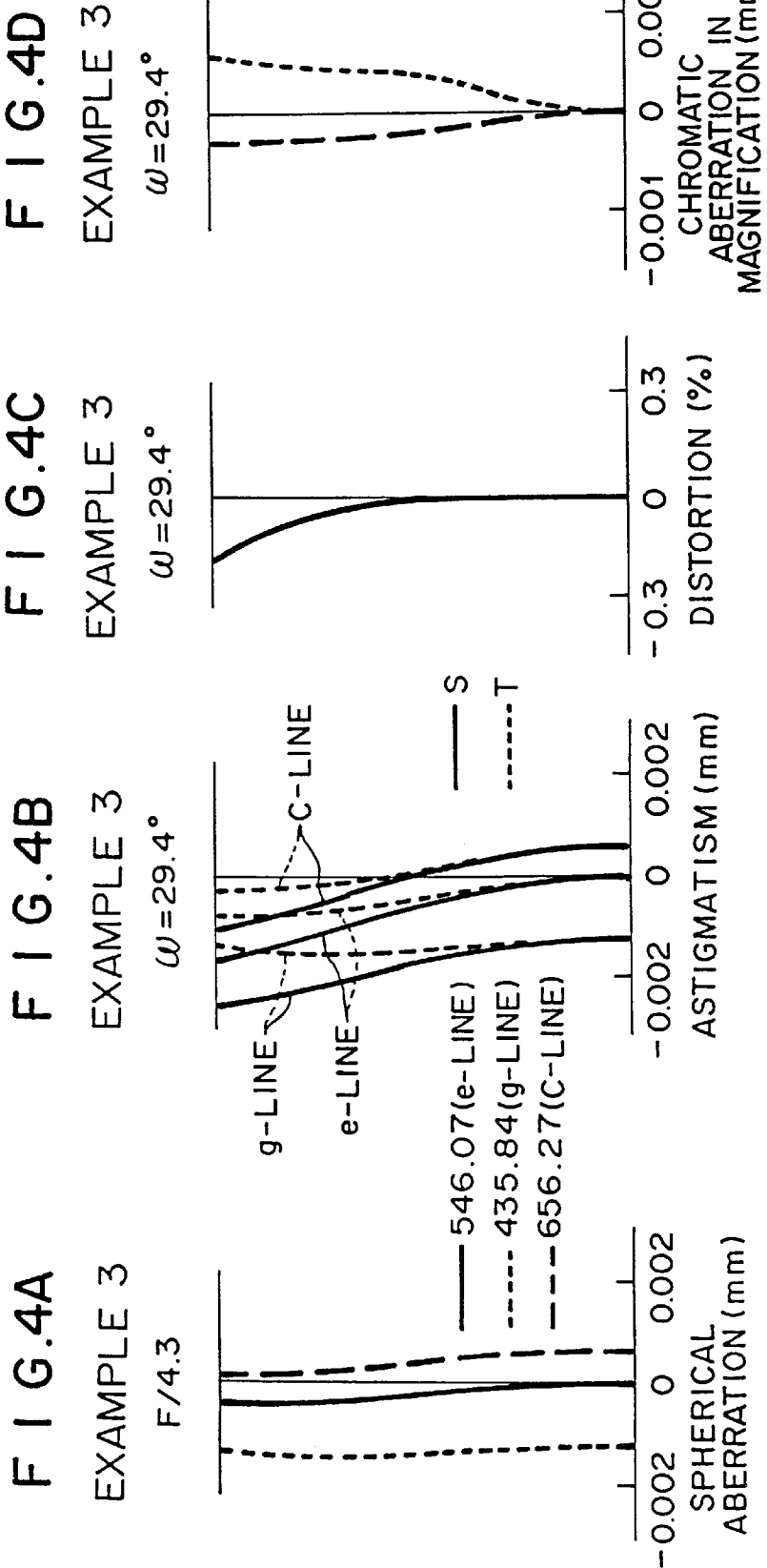

READOUT LENS

RELATED APPLICATIONS

The present application is a continuation-in-part of U.S. patent application Ser. No. 09/022,470 filed on Feb. 12, 1998 (now abandoned). Applicant claims the priority of Japanese Application serial number 9-79084 filed on Mar. 12, 1997, which is incorporated herein by reference.

BACKGROUND OF THE INVENTION

1. Field of the Invention

The present invention relates to an imaging lens, composed of three sheets of lenses, for reading out images, which is used in an optical system of an image readout apparatus such as facsimile machine or image scanner, for example.

2. Description of the Prior Art

It is basically necessary for an image readout lens used in a facsimile machine or image scanner of a type in which an original image forms a reduced or magnified image on an imaging device such as CCD to have a high resolution at an imaging magnification used, a large amount of corner illumination, and minimized distortion. In addition, in response to the recent demands for reducing the size and cost of the optical apparatus as a whole, the lens is required to minimize its size and manufacturing cost.

Known as an imaging lens which can respond to such requirement are three-sheet lenses disclosed in Japanese Patent Publication No. 2-39765 and Japanese Unexamined Patent Publication No. 2-42411.

In the prior art disclosed in the above-mentioned Japanese Patent Publication No. 2-39765, however, since the lens has a large angle of view, image surface curvature may be so large that it is difficult to form images of three colors of blue, green, and red on the same plane, thus failing to be used satisfactorily for reading out color images.

In the prior art disclosed in the above-mentioned Japanese Unexamined Patent Publication No. 2-42411, on the other hand, though brightness is sufficient, angle of view is rather small.

Further, in the prior art disclosed in the Japanese Unexamined Patent Publication No. 63-307414 relates to a photographic lens in a compact camera or like.

In the case of a photographic lens for a camera, even when the focal length is short, an extremely wide angle is not required.

By contrast, in the case of a readout lens for a facsimile machine, image scanner, or the like, an extremely wide angle is required.

SUMMARY OF THE INVENTION

In view of such circumstances, it is an object of the present invention to provide a readout lens having a small size, a light weight, and a wide angle of view, while keeping sufficient performances for reading out color images.

The readout lens in accordance with the present invention comprises, successively from an object side, a positive first lens, a negative second lens, and a positive third lens, and satisfies the following conditional expressions (1) to (6):

(1) $0.85 < f_1/f < 0.93$ (2) $-0.90 < f_2/f_3 < -0.84$ (3) $0.025 < d_2/f < 0.043$ (4) $0.09 < d_5/f < 0.16$ (5) $-2.5 < r_3/r_4 < -2.1$ (6) $|d_6|/f \leq 0.03$ wherein f is a focal length of the readout lens;

$f_i$ is a focal length of the i-th lens;

$d_2$ is an air gap between the first and second lenses;

$d_5$ is a center thickness of the third lens;

$r_3$ is a radius of curvature of the surface of the second lens on the object side;

$r_4$ is a radius of curvature of the surface of the second lens on an imaging surface side; and $d_6$ is a distance between a surface of the third lens on the imaging surface side and the stop.

Preferably, the following conditional expression is satisfied.

$|d_6|/f \leq 0.003$

BRIEF DESCRIPTION OF THE DRAWINGS

FIG. 1 is a schematic view showing a basic lens configuration in accordance with Examples 1, 2 and 3 of the present invention;

FIGS. 3A, 3B, 3C, and 3D are aberration charts (showing spherical aberration, astigmatism, distortion, and chromatic aberration) of the lens in accordance with Example 2; and FIGS. 4A, 4B, 4C, and 4D are aberration charts (showing spherical aberration, astigmatism, distortion, and chromatic aberration) of the lens in accordance with Example 3.

DESCRIPTION OF THE PREFERRED EMBODIMENTS

Figures 2A, 2B, 2C, 2D:
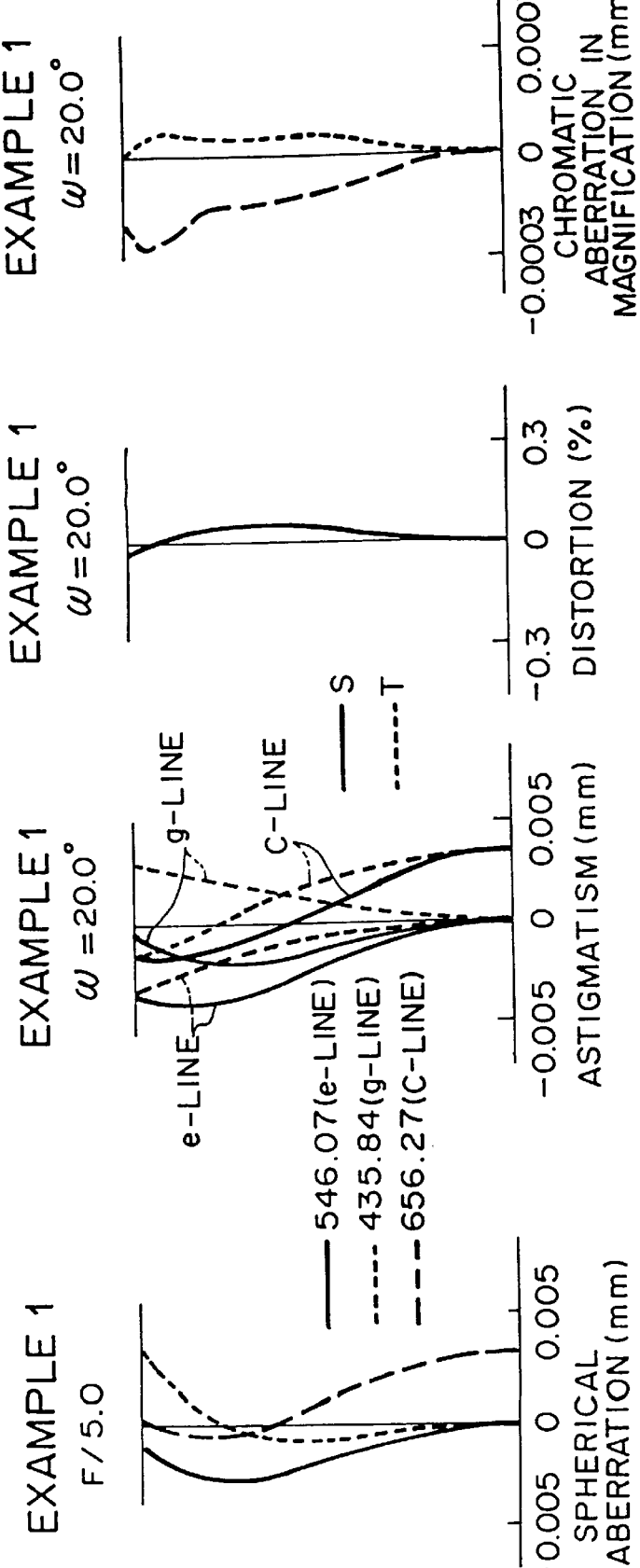
FIGS. 2A, 2B, 2C, and 2D are aberration charts (showing spherical aberration, astigmatism, distortion, and chromatic aberration) of the lens in accordance with Example 1.

In the following, embodiments of the present invention will be explained with reference to the accompanying drawings.

FIG. 1 is a schematic view showing a basic lens configuration in accordance with Examples 1, 2 and 3 of the present invention. As depicted, the imaging lens for reading out images (readout lens) in accordance with each of these examples is a three-sheet lens system constituted by three sheets of lenses $L_1$ to $L_3$, with a stop i disposed downstream the third lens $L_3$. A luminous flux incident on this lens system along an optical axis X from the object side forms an image at an imaging position P.

Here, the first lens $L_1$ is a positive meniscus lens having a convex surface directed onto the object side, the second lens $L_2$ is a biconcave lens having a surface with a greater curvature directed onto the imaging surface side, and the third lens $L_3$ is a biconvex lens.

Also, the lens in accordance with each example satisfies the following conditional expressions:

(1) $0.85 < f_1/f < 0.93$ (2) $-0.90 < f_2/f_3 < -0.84$ (3) $0.025 < d_2/f < 0.043$ (4) $0.09 < d_5/f < 0.16$ (5) $-2.5 < r_3/r_4 < -2.1$ (6) $|d_6|/f \leq 0.03$ wherein f is a focal length of the readout lens;

$f_1$ is a focal length of the 1st lens;

$d_2$ is an air gap between the first and second lenses;

$d_5$ is a center thickness of the third lens;

$r_3$ is a radius of curvature of the surface of the second lens on the object side;

$r_4$ is a radius of curvature of the surface of the second lens on the imaging surface side; and $d_6$ is a distance between a surface of the third lens on the imaging surface side and the stop.

In the following, technical meaning of each of the above-mentioned conditional expressions (1) to (6) will be explained.

The above-mentioned conditional expression (1) defines the ratio of the focal length $f_1$ of the first lens $L_1$ to the composite focal length f of the whole lens system. Below the lower limit of this range, upper light beams yield a larger amount of coma. Beyond the upper limit of this range, by contrast, lower light beams yield a larger amount of coma.

Accordingly, coma can be ameliorated when this conditional expression (1) is satisfied.

The above-mentioned conditional expression (2) defines the ratio of the focal length $f_2$ of the second lens $L_2$ to the focal length $f_3$ of the third lens $L_3$. Below the lower limit of this range, the second lens $L_2$ generates larger amounts of spherical aberration and astigmatism. Beyond the upper limit, by contrast, the negative power of the second lens $L_2$ decreases, thereby increasing the Petzval sum as a whole on the positive side.

Accordingly, when this conditional expression (2) is satisfied, spherical aberration and astigmatism can be made favorable, while the Petzval sum as a whole can be prevented from increasing.

The above-mentioned conditional expression (3) defines the ratio of the air gap $d_2$ between the first lens $L_1$ and second lens $L_2$ to the composite focal length f of the whole lens system. Below the lower limit of this range, spherical aberration is corrected in excess. Beyond the upper limit, by contrast, spherical aberration is corrected insufficiently.

Accordingly, spherical aberration can be ameliorated when this conditional expression (3) is satisfied.

The above-mentioned conditional expression (4) defines the ratio of the thickness $d_5$ of the third lens $L_3$ to the composite focal length f of the whole lens system. Below the lower limit of this range, distortion increases in a pin cushion form. Beyond the upper limit of this range, by contrast, distortion increases in a barrel form.

Accordingly, distortion can be made favorable when this conditional expression (4) is satisfied.

The above-mentioned conditional expression (5) is concerned with the form of the second lens $L_2$, defining the ratio of the radius of curvature $r_3$ of the surface of the second lens $L_2$ on the imaging surface side to the radius of curvature $r_4$ of the second lens $L_2$ on the object side. Below the lower limit of this range, spherical aberration is corrected in excess, whereby astigmatism cannot be corrected with a favorable balance. Beyond the upper limit, by contrast, it becomes difficult to keep spherical aberration and coma at low levels.

Accordingly, when this conditional expression (5) is satisfied, spherical aberration, astigmatism, and coma can be made favorable.

The above-mentioned conditional expression (6) defines the ratio of the distance $|d_6|$ between a surface of the third lens $L_3$ on the imaging surface side and the stop to the composite focal length f of the readout lens.

When this conditional expression (6) is satisfied, the distance between the last lens surface and the stop becomes very short, whereby the diameter of the lens becomes smaller, and a wider angle as well as a higher aperture efficiency are attained.

Further, when the distance between the last lens surface and the stop becomes very short, the height of the luminous flax becomes very lower, whereby compact and light lens system is attained.

Also, as the stop i is disposed downstream the third lens $L_3$, coma flare can be prevented from occurring due to a large aperture ratio.

In the following, each of Examples 1, 2 and 3 will be explained in terms of specific values.

EXAMPLE 1

Table 1 (follows) shows radius of curvature r (mm) of each lens surface, center thickness of each lens and air gap d (mm) between neighboring lenses, and refractive index $N_d$ and Abbe number $\upsilon_d$ of each lens at d-line in this example.

In Table 1, Table 2 (follows) and Table 3 (follows), which will be explained later, numerals referring to each of the marks r, d, $N_d$, and $\upsilon_d$ successively increase from the object side.

The lower part of Table 1 shows values of F/No, imaging magnification β, half angle of view ω, and focal length f of the readout lens.

Further, Table 4 (follows) shows values corresponding the above-mentioned expressions (1) to (6) in this example.

As can be seen from Table 4, Example 1 satisfies all of the conditional expressions (1) to (6), thereby fully correcting each kind of aberration. Also, its brightness ($F_{NO}$=5.0) is sufficient for a readout lens.

EXAMPLE 2

Table 2 shows radius of curvature r (mm) of each lens surface, center thickness of each lens and air gap d (mm) between neighboring lenses, and refractive index $N_d$ and Abbe number $\upsilon_d$ of each lens at d-line in this example.

The lower part of Table 2 shows values of F/No, imaging magnification β, half angle of view ω, and focal length f of the readout lens.

Further, Table 4 shows values corresponding the above-mentioned expressions (1) to (6) in this example.

As can be seen from Table 4, Example 2 satisfies all of the conditional expressions (1) to (6), thereby fully correcting each kind of aberration. Also, its brightness ($F_{NO}$=4.5) is sufficient for a readout lens.

EXAMPLE 3

Table 3 shows radius of curvature r (mm) of each lens surface, center thickness of each lens and air gap d (mm) between neighboring lenses, and refractive index $N_d$ and Abbe number $\upsilon_d$ of each lens at d-line in this example.

The lower part of Table 3 shows values of F/No, imaging magnification β, half angle of view ω, and focal length f of the whole lens system.

Further, Table 4 shows values corresponding the above-mentioned expressions (1) to (6) in this example.

As can be seen from Table 4, Example 3 satisfies all of the conditional expressions (1) to (6), thereby fully correcting each kind of aberration. Also, its brightness ($F_{NO}$=4.3) is sufficient for a readout lens.

FIGS. 2A to 4D are aberration charts (showing spherical aberration, astigmatism, distortion, and chromatic aberration) corresponding to Examples 1, 2 and 3, respectively. In these aberration charts, ω indicates the half angle of view.

Also, each spherical aberration chart shows aberrations with respect to light beams at e-line (546.07 nm), g-line (435.84 nm), and C-line (656.27 nm). Further, each astigmatism chart shows aberrations with respect to sagittal (S) imaging surface and tangential (T) imaging surface.

As can be seen from FIGS. 2A to 4D, all the kinds of aberration mentioned above can be made favorable in accordance with each of the above-mentioned examples.

Without being restricted to the above-mentioned examples, the readout lens in accordance with the present invention can be modified in various manners. For example, the radius of curvature r of each lens and the lens spacing (or lens thickness) d can be appropriately changed.

As explained in the foregoing, since the readout lens in accordance with the present invention is constituted by three sheets of lenses as a whole and satisfies predetermined conditional expressions mentioned above, it can achieve compactness, lighter weight, and lower cost in the lens system, while favorably correcting various kinds of aberration. Also, this readout lens can yield a bright lens system.

TABLE 1

| Surface No. | r | d | $N_d$ | $v_d$ |
|---|---|---|---|---|
| 1 | 30.89 | 12.00 | 1.8830 | 40.7 |
| 2 | 42.13 | 2.65 | | |
| 3 | −76.82 | 1.88 | 1.7847 | 25.7 |
| 4 | 32.56 | 1.77 | | |
| 5 | 53.6.1 | 10.54 | 1.8340 | 37.2 |
| 6 | −53.61 | −0.23 | | |
| 7 | ∞ (Stop) | | | |

| F/No | 5.0 |
|---|---|
| Magnification β | −0.1106 |
| Half angle of view ω | 20.0° |
| Focal length f | 100 mm |

TABLE 2

| Surface No. | r | d | $N_d$ | $v_d$ |
|---|---|---|---|---|
| 1 | 41.95 | 20.31 | 1.8040 | 46.6 |
| 2 | 75.23 | 3.92 | | |
| 3 | −93.87 | 4.05 | 1.7618 | 26.5 |
| 4 | 42.15 | 2.29 | | |
| 5 | 71.50 | 15.68 | 1.8830 | 40.8 |
| 6 | −71.50 | 0.33 | | |
| 7 | ∞ (Stop) | | | |

| F/No | 4.5 |
|---|---|
| Magnification β | −0.1807 |
| Half angle of view ω | 27.7° |
| Focal length f | 100 mm |

TABLE 3

| Surface No. | r | d | $N_d$ | $v_d$ |
|---|---|---|---|---|
| 1 | 43.00 | 21.87 | 1.7762 | 49.6 |
| 2 | 88.54 | 3.90 | | |
| 3 | −83.48 | 4.18 | 1.7231 | 29.5 |
| 4 | 37.42 | 3.03 | | |
| 5 | 63.53 | 15.18 | 1.8108 | 40.9 |
| 6 | −63.53 | 2.28 | | |
| 7 | ∞ (Stop) | | | |

TABLE 3-continued

| F/No | 4.3 |
|---|---|
| Magnification β | −0.1102 |
| Half angle of view ω | 14.8° |
| Focal length f | 100 mm |

TABLE 4

| Expression | Value | Example 1 | Example 2 | Example 3 |
|---|---|---|---|---|
| (1) $0.85 < f_1/f < 0.93$ | $f_1/f$ | 0.869 | 0.921 | 0.890 |
| (2) $-0.90 < f_2/f_3 < -0.84$ | $f_2/f_3$ | −0.860 | −0.883 | −0.851 |
| (3) $0.025 < d_2/f < 0.043$ | $d_2/f$ | 0.027 | 0.039 | 0.039 |
| (4) $0.09 < d_5/f < 0.16$ | $d_5/f$ | 0.105 | 0.157 | 0.151 |
| (5) $-2.5 < r_3/r_4 < -2.1$ | $r_3/r_4$ | −2.360 | −2.227 | −2.230 |
| (6) $|d_6|/f \leq 0.03$ | $|d_6|/f$ | 0.002 | 0.003 | 0.023 |

What is claimed is:

1. A lens system comprising, successively from an object side to an image side:

a positive first lens;

a negative second lens;

a positive third lens; and a stop, each of said three lenses having an object side surface and an imaging side surface and wherein said readout lens fulfills the following conditions (1) to (6):

(1) $0.85 < f_1/f < 0.93$ (2) $-0.90 < f_2/f_3 < -0.84$ (3) $0.025 < d_2/f < 0.043$ (4) $0.09 < d_5/f < 0.16$ (5) $-2.5 < r_3/r_4 < -2.1$ (6) $|d_6|/f \leq 0.03$ where:

f is a focal length of said readout lens as a whole;
$f_1$ is a focal length of the first lens;
$f_2$ is a focal length of the second lens;
$f_3$ is a focal length of the third lens;
$d_2$ is an air gap between the first and second lenses;
$d_5$ is a center thickness of the third lens;
$r_3$ is a radius of curvature on the object side surface of the second lens;
$r_4$ is a radius of curvature on the imaging side surface of the second lens; and
$d_6$ is a distance between the imaging side surface of the third lens and the stop
wherein said lens system is a readout lens for an imaging device.

* * * * *

UNITED STATES PATENT AND TRADEMARK OFFICE
CERTIFICATE OF CORRECTION

PATENT NO. : 6,111,704
DATED : August 29, 2000
INVENTOR(S) : Takayuki NODA, et al.

It is certified that error appears in the above-indentified patent and that said Letters Patent is hereby corrected as shown below:

Column 6, line 33 (Claim 1), please delete the word "readout"

Column 6, line 41 (Claim 1), please delete the word "readout"

Signed and Sealed this

Twenty-ninth Day of May, 2001

Attest:

NICHOLAS P. GODICI

*Attesting Officer*         *Acting Director of the United States Patent and Trademark Office*